March 21, 1939.  L. P. SHARPLES  2,150,944
TREATMENT OF CREAMERY PRODUCTS
Filed May 13, 1937
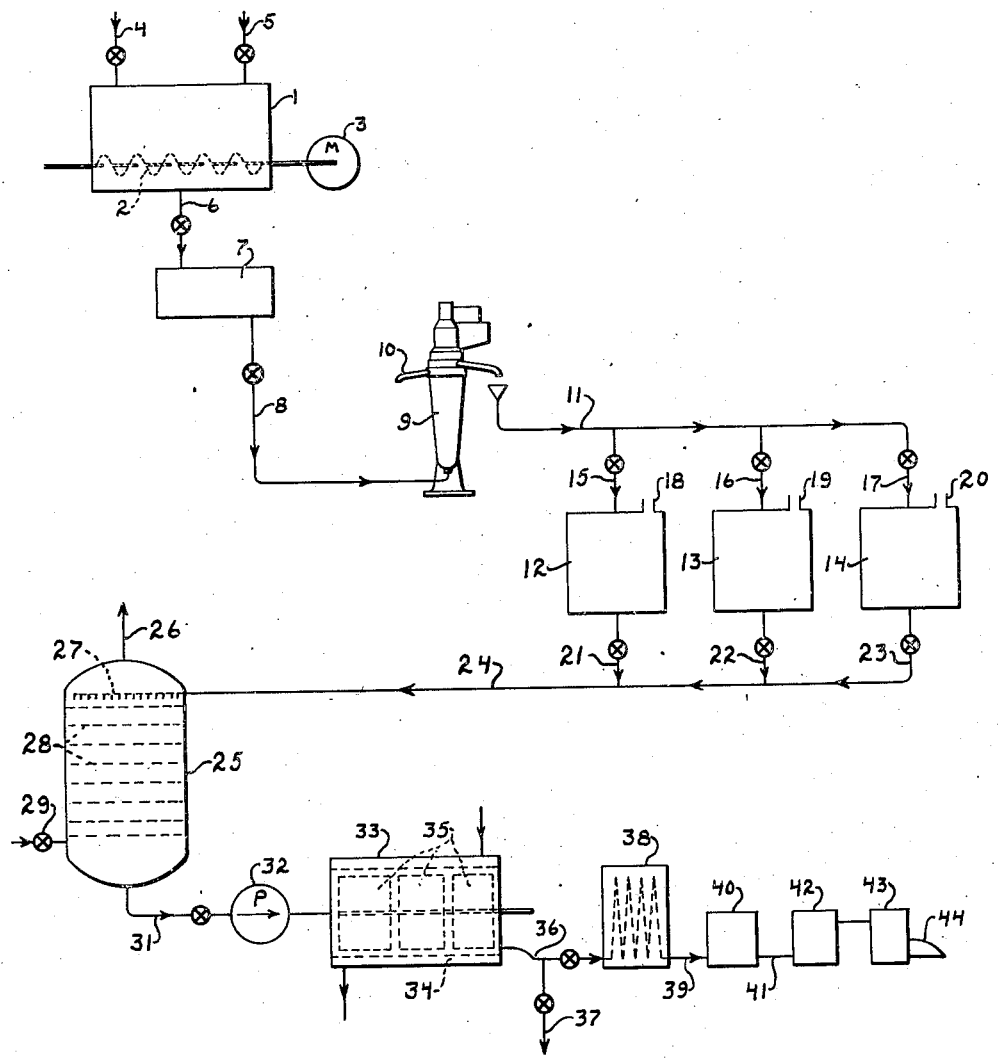
INVENTOR
Laurence P. Sharples
BY
Maurice A. Crews
ATTORNEY Patented Mar. 21, 1939

2,150,944

UNITED STATES PATENT OFFICE 2,150,944

TREATMENT OF CREAMERY PRODUCTS

Laurence P. Sharples, Ardmore, Pa., assignor to Milk Processes, Inc., Philadelphia, Pa., a corporation of Pennsylvania Application May 13, 1937, Serial No. 142,422

5 Claims. (Cl. 99—62)

The present invention relates to an improved process for preparing and preserving milk products, particularly concentrated or plastic creams, and butter or other milk fat containing products. Examples of products which may be treated in accordance with my invention, and methods for the preparation thereof, are the creamery products described in U. S. Patents Nos. 1,791,069, 1,977,927, 1,977,928, 1,977,929 and Re-issue No. 19,123 to Herman D. Wendt.

A principal object of this invention is the treatment of creamery products of the nature of those described in the above mentioned patents to improve the keeping qualities thereof, particularly with respect to the maintenance of desirable flavor and the prevention of rancidity while in storage or during transit.

A further object of this invention is the provision of a method for producing creamery products of a relatively definite composition, and the maintenance of that composition or ratio of ingredients one to another in said product during subsequent processing to which such product may be subjected for the working up thereof into marketable form.

A further object of this invention is the removal, during the production of an intermediate or finished creamery product, of deleterious gases such as air or oxygen, which, if permitted to remain dissolved or entrained in such product, will cause same to deteriorate.

Other objects and advantages of my invention will appear to those skilled in the art, and my invention will be further illustrated with reference to the accompanying drawing wherein there is represented diagrammatically, apparatus suitable for carrying out my process.

In the drawing, I represents a tank of the general type employed in creameries for the neutralization of sour milk products, particularly cream. Such tank is provided with a stirring and/or heating coil 2 rotated by suitable means, such as an electric motor 3. Through the coil 2 there may be circulated a heating or cooling medium, as desired. Tank I is further provided with a valve-controlled pipe 4 for introducing the milk product to be treated and with valve-controlled pipe 5 for introducing a treating agent, for example, a suitable neutralizing agent. From the bottom of tank I extends the valve-controlled pipe 6 which is connected to a heater 7. This heater is preferably of the tubular type, and the milk product is heated to the desired extent by passage therethrough in indirect contact with a suitable heating medium. The heater 7 is connected by means of valve-controlled pipe 8 to a high speed centrifugal separator 9.

The centrifugal separator 9 is provided with a discharge pipe 10 for conducting away the skim milk phase and with a conduit 11 for directing the cream to one or more of the standardizing tanks 12, 13 and 14 by means of valve-controlled pipes 15, 16 and 17 respectively. The standardizing tanks 12, 13 and 14 are provided with apertures 18, 19 and 20 respectively, through which there may be introduced measured amounts of the necessary ingredients, such as water, salt, flavoring, coloring and the like, and a stirring rod for stirring same in. Three such tanks are preferably employed so that the process may be operated substantially continuously, i. e., tank 12 may be filled while the contents of tank 13 is being tested and brought to the desired standard, and while the standardized contents of tank 14 is being conducted to the next step of the process. Valve-controlled conduits 21, 22 and 23 extending from the bottom of the standardizing tanks 12, 13 and 14 are connected to a conduit 24 for introducing the contents of one or more of the standardizing tanks into the degassing vessel 25.

The degassing vessel 25 may comprise a pressure-resistant tank equipped with a vacuum line 26 connected to a vacuum pump (not shown), and with a spray head or distributor 27 for introducing the standardized milk product from conduit 24 into vessel 25 as a series of fine streams or as a spray. Baffle plates 28 may be provided within the vessel 25 in order that the milk product, in its downward flow thereover, may be exposed in thin films over a relatively large surface to degassing at reduced pressure. Adjacent the bottom of vessel 25 there may be provided the valve-controlled inlet pipe 29 for introducing an inert gas such as carbon dioxide or nitrogen to aid in deaeration of the standardized milk product. The inert gas should contain enough water vapor to prevent absorption of water vapor from cream in vessel 25.

A valve-controlled draw-off pipe 31 is provided at the bottom of vessel 25, said pipe leading to pump 32 and from pump 32 to cooler 33. Cooler 33 is of the totally enclosed type and comprises a tank provided with cooling jacket 34 and a rotating scraper 35. Extending from the discharge outlet of the cooler 33 is a valve-controlled pipe 36 provided with a valve-controlled T-connection 37 from which the cooled milk product may be withdrawn, if desired. Pipe 36 is connected to an aging means 38 which, for example, may comprise simply a jacketed pipe coil of sufficient length to permit the cooled milk product, in its passage therethrough, to attain a desired texture. The aging means 38 is connected by means of pipe 39 to a converter 40 wherein the cooled and aged milk product may be subjected to agitation, such as that required to convert the product into butter. The milk product, after being subjected to treatment in the converter 40 to produce butter, may be conducted therefrom by conduit 41 to a printing or moulding means 42 and thence to a cutting and wrapping device represented by 43, the final marketable product being delivered therefrom by means of chute 44.

In operating the process in accordance with my invention, a milk product such as cold, sour cream having an acidity of, for example, from about 0.3% to about 1%, and containing from about 20% to about 45% of butter fat, is supplied to the treating tank 1 by means of valve-controlled pipe 4. Sufficient neutralizing agent, such as sodium or potassium hydroxide solution, is added through valve-controlled pipe 5 to bring the acidity of the cream preferably to about 0.05%. The contents of the tank 1 may be agitated under proper temperature conditions by means of heated stirring coil 2 until the desired neutralization is completed. The cream is then passed, preferably by means of a pump (not shown), through valve-controlled pipe 6 into the tubular heater 7, wherein the temperature of the cream is increased sufficiently to permit efficient centrifugation. Such temperature is preferably of the order of from 130 degrees F. to 180 degrees F. The heated cream is thereafter passed from the heater 7 by means of valve-controlled pipe 8, into the centrifugal separator 9, wherein it is both purified and separated. The solids which may be separated by sedimentation remain as bowl cake in the centrifuge bowl, while the heavy effluent comprising skim milk and the majority of the products of neutralization, are discharged from the centrifuge through pipe 10. The concentrated cream, containing upwards of 65% butter fat, and preferably from about 82% to about 85% butter fat, is withdrawn from the centrifuge at a temperature of, for example, about 135 degrees F., by means of conduit 11, and is introduced into any one of the standardizing tanks 12, 13 and 14 which may be empty at the time. While one of these tanks is being filled, the contents of a second tank may be tested for butter fat content, and sufficient ingredients such as salt and water may be added to bring the salt content to 2% and the fat content to 80%, or such content as is determined by creamery operation to be necessary in order to produce a finished butter having the legally required content of not less than 80% butter fat. Sufficient water is added to the product during this step of the process to compensate for that which is subsequently lost by evaporation. The quantity of water to be added will be dictated by analysis of samples of the final product from time to time. The standardized contents of the third tank, for example, tank 14, at a temperature of, for example, about 130 degrees F., is withdrawn by means of valve-controlled conduit 23 and passed through conduit 24 and distributor or spray 27 into the degassing vessel 25. A reduced pressure is maintained within vessel 25 by means of a vacuum pump (not shown) connected to pipe 26, such reduced pressure preferably being sufficient to effect removal of dissolved and/or entrained air or oxygen from the warm cream, but insufficient to cause boiling of the water content thereof. The sub-atmospheric pressure maintained within the vessel 25 will thus depend to a considerable extent upon the temperature of the cream undergoing degassing. The cream, introduced as a plurality of streams by means of distributor 27, flows downwardly over baffle plates 28, thereby being exposed in thin films over a large surface area. From such thin films the dissolved and/or entrained air and other undesirable gases are separated to substantial extent, and such air together with a small quantity of water vapor, is withdrawn from the vessel 25 through the vacum line 26. The removal of air from the warm cream may be further assisted by introducing an inert gas such as carbon dioxide or nitrogen into the lower section of vessel 25 by means of valve-controlled pipe 29.

As an alternative for the step above set forth, degassing of the cream may be effected by simply passing an inert gas through it without the application of a vacuum.

The substantially deaerated cream collecting in the lower section of vessel 25 may be withdrawn therefrom by means of valve-controlled pipe 31 and pumped by pump 32 into the cooler 33, and since this portion of the system is entirely closed, no air, oxygen or other contaminating gases come in contact with the deaerated cream during such transfer, or while the cream is passing through the cooler. In cooler 33 the cream is cooled to a condition of plasticity by indirect heat exchange with a cooling fluid, such as brine or expanded ammonia gas in jacket 34, the cream being reduced to a temperature, preferably between 20 degrees F. and 50 degrees F. The chilled cream adhering to the walls of the cooler will be removed therefrom by means of the rotating scraper blades 35, and will pass along with the bulk of the cooled, plastic cream through valve-controlled pipe 36 to the aging means 38 wherein the texture of the plastic cream is changed through aging to the proper condition for working in the converter 40. Within the converter 40, the plastic cream is agitated sufficiently to reverse the phase of the emulsion and thus produce the texture which characterizes marketable butter. Such conversion must be sufficient to produce a smooth, plastic consistency in the finished butter, since insufficient agitation will result in the production of a crumbly product. The butter from the converter 40 may be passed while still under pressure, through the conduit 41 into the conventional printing or moulding means 42, and thence into the wrapping device represented by 43. The final product is delivered as finished, packaged butter by means of the chute 44.

The operation of my process as above described is substantially continuous. However, the entire process need not necessarily be continuous. For example, the cold plastic cream from the cooler 33 may be withdrawn from the system by means of valve-controlled pipe 37. This chilled cream, having the proper content of butter fat and other ingredients, may be placed in cold storage to age. This permits a longer aging period and an aging at low temperatures, both of which may have a desirable effect upon the texture of the butter produced by subsequent conversion of the cream thus aged.

The plastic cream produced in accordance with my invention need not be converted into butter. Plastic creams not intended for conversion into butter may contain less than 80% butter fat, i. e., of the order of 65% or more butter fat, and such creams may likewise be produced in accordance with my invention. In those instances where it is desirable to retain the plastic cream in the cream phase of the emulsion, it is necessary to prevent overworking the cream during its passage through the cooling means, since substantial agitation may reverse the phase equilibrium and convert the cream phase into the butter phase.

It will be seen that in accordance with my invention there is provided a process for converting creamery products into plastic cream or butter in such a manner that the cream product, after having been standardized with respect to the ratio of the various ingredients, is subjected to the remaining steps of process without having its composition altered to any substantial extent. In other words, the composition of the standardized cream once having been adjusted in the standardizing tanks, such cream may be processed to the final chilled plastic cream or butter of desired specifications without further substantial adjustment. Moreover, the plastic cream, after standardization and deaeration, is not again permitted to come into contact with air or oxygen until after it is in plastic form and, if packaged then only to the extent that the package permits such contact. Such steps of deaeration, followed by the various processing steps carried on out of contact with air or oxygen, results in the production of plastic cream or butter which will retain its desired flavor to a greater degree than the creams or butter produced by conventional methods.

It is obvious that minor changes in the steps of process may be made without departing from the scope of the invention as set forth in the appended claims.

What I claim is:

1. The method of producing a standardized plastic creamery product having a given butter fat content which comprises the steps of centrifuging a liquid creamery product containing butter fat in the dispersed phase to produce a cream containing at least 65% butter fat and in excess of the proportion of butter fat desired in the final product, diluting said concentrated cream to produce a liquid cream having the approximate proportion of butter fat desired in the final product, subjecting said diluted cream to sub-atmospheric pressure sufficient to substantially de-gas said cream, and thereafter cooling said cream in a closed system under conditions preventing contact with the atmosphere to a temperature sufficiently low to convert said cream to a condition of plasticity, and working said plastic product in a manner to avoid expulsion of liquid therefrom to change the texture of said product while retaining its standardized liquid content.

2. The method of producing a standardized plastic creamery product having a given butter fat content which comprises the steps of centrifuging a liquid creamery product containing butter fat in the dispersed phase to produce a cream containing at least 65% butter fat and in excess of the proportion of butter fat desired in the final product, diluting said concentrated cream to produce a liquid cream having the approximate proportion of butter fat desired in the final product, subjecting said diluted cream to sub-atmospheric pressure sufficient to substantially de-gas said cream, and thereafter cooling said cream in a closed system under conditions preventing contact with the atmosphere to a temperature sufficiently low to convert said cream to a condition of plasticity, and changing the texture of said plastic product by subjecting the same to pressure in such a manner as to avoid expulsion therefrom of liquid.

3. The method of producing a standardized plastic creamery product having a given butter fat content which comprises the steps of centrifuging a liquid creamery product containing butter fat in the dispersed phase to produce a cream containing at least 65% butter fat and in excess of the proportion of butter fat desired in the final product, diluting said concentrated cream to produce a liquid cream having the approximate proportion of butter fat desired in the final product, subjecting said diluted cream to sub-atmospheric pressure sufficient to substantially de-gas said cream, and thereafter cooling said cream in a closed system under conditions preventing contact with the atmosphere to a temperature sufficiently low to convert said cream to a condition of plasticity, and pressing said plastic product to reverse the phase thereof while retaining its whole standardized liquid content.

4. The method of producing a standardized plastic creamery product having a given butter fat content which comprises the steps of centrifuging a liquid creamery product containing butter fat in the dispersed phase to produce a cream containing at least 65% butter fat and in excess of the proportion of butter fat desired in the final product, diluting said concentrated cream to produce a liquid cream having the approximate proportion of butter fat desired in the final product, subjecting said diluted cream to sub-atmospheric pressure sufficient to substantially de-gas said cream, and thereafter cooling said cream in a closed system under conditions preventing contact with the atmosphere to a temperature sufficiently low to convert said cream to a condition of plasticity, and thereafter working said plastic product to produce butter while avoiding expulsion therefrom of any of its standardized liquid content.

5. The method of producing a standardized plastic creamery product having a given butter fat content which comprises the steps of centrifuging a liquid creamery product containing butter fat in the dispersed phase to produce a cream containing at least 65% butter fat and in excess of the proportion of butterfat desired in the final product, diluting said concentrated cream to produce a liquid cream having the approximate proportion of butter fat desired in the final product, subjecting said diluted cream to sub-atmospheric pressure sufficient to substantially de-gas said cream, and thereafter cooling said cream in a closed system under conditions preventing contact with the atmosphere to a temperature sufficiently low to convert said cream to a condition of plasticity, and thereafter pressing said plastic product in such a manner as to produce butter while avoiding expulsion therefrom of any of its standardized liquid content.

LAURENCE P. SHARPLES.